US007664251B2

(12) United States Patent
Lowmaster

(10) Patent No.: US 7,664,251 B2
(45) Date of Patent: Feb. 16, 2010

(54) ABBREVIATED DIALING BETWEEN PBX AND CENTREX SYSTEMS USING A VOIP PLATFORM

(75) Inventor: Robert Paul Lowmaster, Bartlett, IL (US)

(73) Assignee: AT&T Intellectual Property I, LP, Reno, NV (US)

( * ) Notice: Subject to any disclaimer, the term of this patent is extended or adjusted under 35 U.S.C. 154(b) by 921 days.

(21) Appl. No.: 10/946,358

(22) Filed: Sep. 21, 2004

(65) Prior Publication Data

US 2006/0062372 A1  Mar. 23, 2006

(51) Int. Cl.
*H04M 7/00* (2006.01)
(52) U.S. Cl. .................. 379/225; 379/216.01; 370/352
(58) Field of Classification Search ............ 379/216.01; 370/352
See application file for complete search history.

(56) References Cited

U.S. PATENT DOCUMENTS

| | | | |
|---|---|---|---|
| 5,247,571 A | 9/1993 | Kay et al. | |
| 5,574,780 A * | 11/1996 | Andruska et al. ...... | 379/221.09 |
| 5,991,292 A | 11/1999 | Focsaneanu et al. | |
| 6,160,882 A * | 12/2000 | Weik et al. ............. | 379/220.01 |
| 6,252,952 B1 | 6/2001 | Kung et al. | |
| 6,490,345 B2 * | 12/2002 | Fleischer et al. ........ | 379/114.01 |
| 6,718,030 B1 | 4/2004 | Turner et al. | |
| 6,804,224 B1 | 10/2004 | Schuster et al. | |
| 7,257,205 B2 * | 8/2007 | Forte ...................... | 379/112.02 |
| 2002/0037075 A1 | 3/2002 | Flanagan | |
| 2002/0131575 A1* | 9/2002 | Gallant .................. | 379/220.01 |
| 2002/0172339 A1 | 11/2002 | Creswell et al. | |
| 2003/0078962 A1* | 4/2003 | Fabbricatore et al. ....... | 709/203 |
| 2004/0179669 A1 | 9/2004 | Gilbert et al. | |

FOREIGN PATENT DOCUMENTS

EP  1 113 659 A2  7/2001

OTHER PUBLICATIONS

International Search Report and Written Opinion of the International Searching Authority for International Application No. PCT/US05/29890, Mailed on Feb. 3, 2006.

* cited by examiner

*Primary Examiner*—Ahmad F Matar
*Assistant Examiner*—Antim Shah
(74) *Attorney, Agent, or Firm*—Toler Law Group

(57) ABSTRACT

An abbreviated dialing feature over a Voice over Internet Protocol (VoIP) platform facilitates abbreviated dialing between a first phone system that serves a first customer location and a second phone system that serves a second customer location. The first and second phone systems may comprise two Centrex groups, two PBXs or a Centrex group and a PBX.

13 Claims, 1 Drawing Sheet

ABBREVIATED DIALING BETWEEN PBX AND CENTREX SYSTEMS USING A VOIP PLATFORM

FIELD OF THE DISCLOSURE

The present disclosure relates to private branch exchange (PBX) and Centrex systems.

BACKGROUND

U.S. Pat. No. 5,247,571 to Kay et al. discloses an area-wide Centrex service. Among the features provided by the area-wide Centrex service is an extension dialing feature. The extension dialing feature allows a multi-location customer to provide a specialized, abbreviated dialing plan for calls between multiple locations. Using this feature, an area-wide Centrex station user can call any other station in the area-wide Centrex network using the specialized dialing plan. This feature offers multi-location Centrex customers a uniform abbreviated dialing plan between their PBX locations, Centrex locations, ISDN lines, and residential lines for people working from home.

BRIEF DESCRIPTION OF THE DRAWINGS

The present invention is pointed out with particularity in the appended claims. However, other features are described in the following detailed description in conjunction with the accompanying drawing in which:

DETAILED DESCRIPTION OF THE DRAWING

Figure 1:
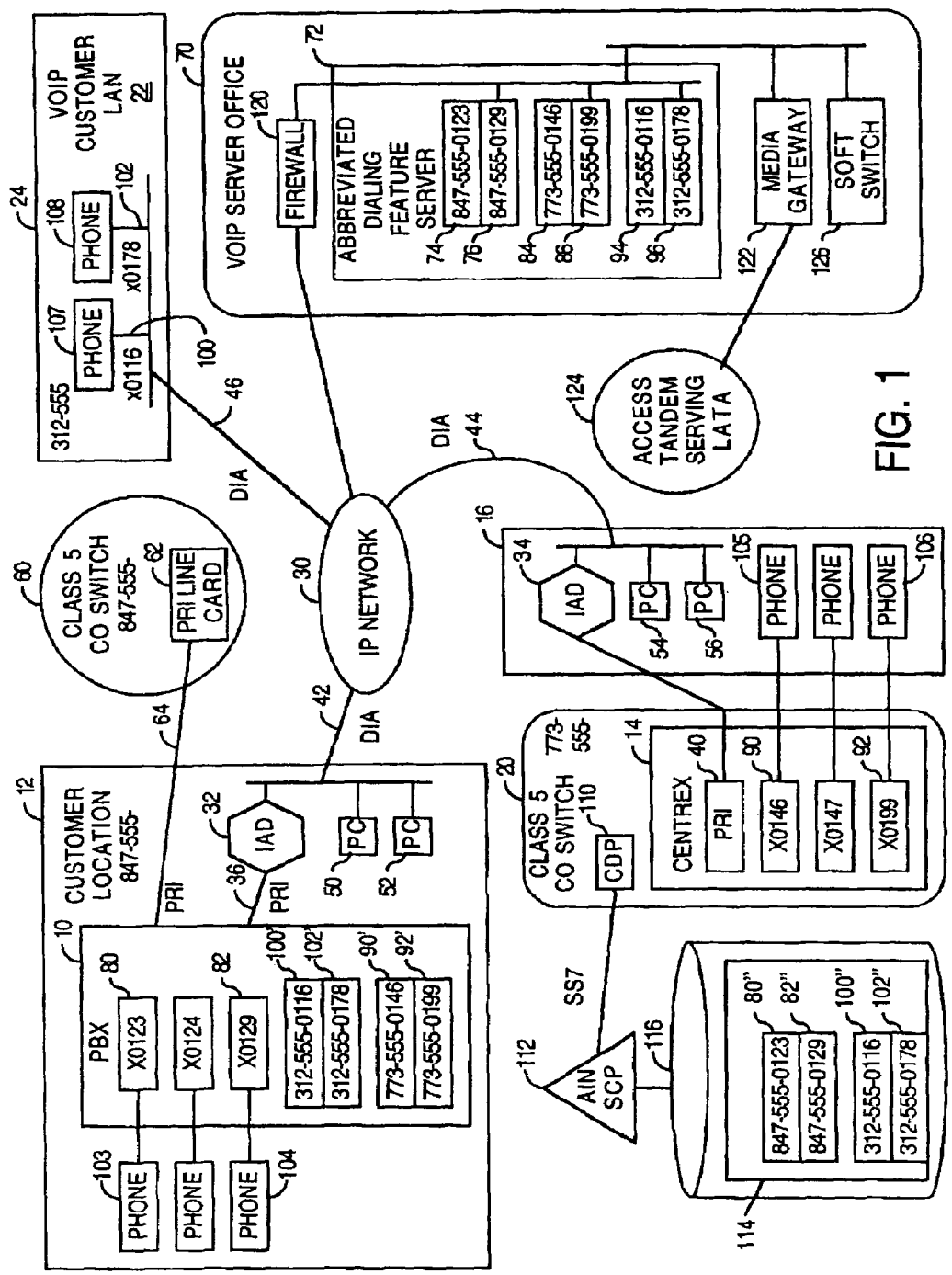
FIG. 1 is a block diagram of an embodiment of a system to provide an abbreviated dialing feature over a VoIP platform.

Embodiments of the present invention use a Voice over Internet Protocol (VoIP) provider's Internet Protocol (IP) network to provide abbreviated dialing features to customers who have multiple locations served by PBXs, Centrex systems, or a combination of PBXs and Centrex systems. By carrying abbreviated dialing (e.g. four-digit dialing) calls over the VoIP provider's IP network, PBX or Centrex end users at any location can call PBX or Centrex users at other locations without incurring local or toll usage charges.

FIG. 1 is a block diagram of an embodiment of a system to provide an abbreviated dialing feature over a VoIP platform. In general, the system can be used to provide abbreviated dialing between any number of telephone systems, each of which serving a different customer location. The telephone systems may comprise any number of PBXs, or any number of Centrex groups, or any combination of PBXs and Centrex groups, for example, serving different customer locations. However, for purposes of illustration and example, the system is described with reference to a PBX 10 at a customer location 12, a Centrex group 14 provided to a customer location 16 by a Class 5 central office switch 20, and a VoIP customer local area network (LAN) 22 at a customer location 24.

An access point to a VoIP provider's IP network 30 is placed at each of the PBXs and/or Centrex groups. The access points enable the various PBXs and/or Centrex groups to communicate and interwork with each other over the VoIP provider's IP network 30. The VoIP provider further may permit the PBXs and/or Centrex groups to interwork with their VoIP-served locations (e.g. the customer location 24), as well as place calls to other destinations via the IP network 30.

In one embodiment, an Integrated Access Device (IAD) is deployed as a Customer-Provided Equipment (CPE) endpoint on each of the various PBXs and/or Centrex groups. Each IAD serves as a customer-provided media gateway that converts analog time-division multiplexed (TDM) voice traffic into IP packetized voice (e.g. VoIP) signals, and vice-versa. With reference to the example in FIG. 1, an IAD 32 is deployed at the customer location 12 to serve the PBX 10, and an IAD 34 is deployed at the customer location 16 to serve the Centrex group 14.

As illustrated in FIG. 1, the PBX 10 may interface to the IAD 32 by a Primary Rate Interface (PRI) 36. Alternatively, the interface of the PBX 10 to the IAD 32 may comprise stations of the PBX 10 since the PBX 10 is under full customer control.

Also as illustrated in FIG. 1, the Centrex group 14 may interface to the IAD 34 by a PRI facility 40 built as part of the Centrex group 14. Alternatively, the interface of the Centrex group 14 to the IAD 34 may comprise a set of Centrex lines for the Centrex group 14.

The IP network 30 managed by the VoIP provider interfaces to the IADs over an Internet access facility such as Dedicated Internet Access (DIA), for example. In the example of FIG. 1, the IAD 32 interfaces to the IP network 30 over a DIA 42 or an alternative Internet access facility to provide access to the IP network by the PBX 10. The IAD 34 interfaces to the IP network 30 over a DIA 44 or an alternative Internet access facility to provide access to the IP network 30 by the Centrex group 14. The VoIP customer LAN 22 at the customer location 24 interfaces, without an IAD, to the IP network 30 over a DIA 46 or an alternative Internet access facility.

The IAD 32 converts traditional outgoing voice calls of the PBX 10 into VoIP packets, and delivers the packets to the VoIP provider's IP network 30 over the DIA 42 or alternative Internet access facility. Similarly, the IAD 34 converts traditional outgoing voice calls of the Centrex group 14 into VoIP packets, and delivers the packets to the VoIP provider's IP network 30 over the DIA 44 or alternative Internet access facility.

For incoming VoIP calls placed to the PBX 10, the IAD 32 receives VoIP packets over the DIA 42 or alternative Internet access facility, converts the VoIP packets into a traditional voice call signal, and delivers the signal to the PBX 10. Similarly, for incoming VoIP calls placed to the Centrex group 14, the IAD 34 receives VoIP packets over the DIA 44 or alternative Internet access facility, converts the VoIP packets into a traditional voice call signal, and delivers the signal to the Centrex group 14.

Calls placed between the PBX 10 and the Centrex group 14 are transmitted across the VoIP provider's IP network 30, and potentially over the Internet, as on-net VoIP data transmissions. The VoIP data transmission is part of an Internet Service Provider's (ISP's) information service. The ISP's information service may further provide Internet access to one or more computers 50 and 52 at the customer location 12 via the DIA 42, and one or more computers 54 and 56 at the customer location 16 via the DIA 44. The IAD 32 and the computers 50 and 52 access the DIA 42 via a LAN at the customer location 12. Similarly, the IAD 34 and the computers 54 and 56 access the DIA 44 via a LAN at the customer location 16.

Centrex calls provided in this way have no incremental Incumbent Local Exchange Carrier (ILEC) or Interexchange Carrier (IXC) related charges because the Class 5 switch 20 views these calls as being intra-Centrex. Similarly, intra-PBX calls provided in this way have no telco-related charges because the calls never reach a Public Switched Telephone Network (PSTN). For example, the intra-PBX calls provided in this way do not reach a Class 5 central office switch 60 that serves the PBX 10. The Class 5 switch 60 may comprise a PRI line card 62 to interface with the PBX 10 via a PRI 64.

The VoIP service provider has an associated VoIP server office 70 in communication with the IP network 30. The VoIP server office 70 has an abbreviated dialing feature server 72 on which number ranges for the PBX 10, the Centrex group 14 and the VoIP customer LAN 22 are built and maintained to assist in routing calls. For purposes of illustration and example, the feature server 72 stores: data elements 74 and 76 for telephone numbers 80 and 82, respectively, of the PBX 10; data elements 84 and 86 for telephone numbers 90 and 92, respectively, of the Centrex group 14; and data elements 94 and 96 for telephone numbers 100 and 102, respectively, of the VoIP customer LAN 22.

At the customer location 12, telephones 103 and 104 are end stations for the telephone numbers 80 and 82, respectively. At the customer location 16, telephones 105 and 106 are end stations for the telephone numbers 90 and 92, respectively. At the customer location 24, telephones 107 and 108 are end stations for the telephone numbers 100 and 102, respectively.

In general, number ranges associated with foreign Centrex groups, PBXs, and VoIP provider-served locations that are to be included in the interworking arrangement are to be added to and maintained in routing tables of the Centrex groups and the PBXs. In the example of FIG. 1, the PBX 10 is modified to store the number range of the Centrex group 14 and the number range of the VoIP customer LAN 22 in its routing table. Thus, data elements 90' and 92' for the telephone numbers 90 and 92 of the Centrex group 14, and data elements 100' and 102' for the telephone numbers 100 and 102 of the VoIP customer LAN 22 are added to and stored in the routing table of the PBX 10 with instructions to route abbreviated-dialed calls associated with these numbers to the IAD 32. The IAD 32 communicates the abbreviated-dialed call to the IP network 30 for processing by the VoIP server office 70.

The issue is more complex for a Centrex group due to limitations placed on translation tables in the Class 5 switch 20. If the number ranges used by the other customer locations are numbers that otherwise would be served by the Class 5 switch 20 that hosts the Centrex group 14, then these numbers can be added to a routing table of the Class 5 switch 20 with routing instructions to direct calls to these numbers to the IAD 34 via the PRI facility 40. If the number ranges used by the other customer locations are not consistent with the numbers normally served by the Class 5 switch 20, then an alternative to routing table management is used.

One alternative is to use Advanced Intelligent Network (AIN) functionality which can be trigged using a Customized Dialing Plan (CDP) AIN trigger 110 in the Class 5 switch 20. An abbreviated-dialed call originated by the Centrex group 14 that is not recognized by the Class 5 switch 20 as being an intra-Centrex call triggers a query to a Service Control Point (SCP) 112. A routing table 114 is built on a database 116 of the SCP 112 with instructions that abbreviated-dialed calls to numbers in the routing table 114 are to be routed to the PRI 40 that terminates on the IAD 34. In the example of FIG. 1, the routing table 114 stores the number range of the PBX 10 and the number range of the VoIP customer LAN 22. Thus, the routing table 114 includes data elements 80" and 82" for the telephone numbers 80 and 82 of the PBX 10 and data elements 100" and 102" for the telephone numbers 100 and 102 of the VoIP customer LAN 22.

The SCP 112 processes the query from the Class 5 switch 20 based on the routing table 114 and provides a response message back to the Class 5 switch 20. In particular, the SCP 112 accesses the routing table 114 and responds to the query by providing a routing instruction that directs the Class 5 switch 20 to route the abbreviated-dialed call to the PRI 40 terminating on the IAD 34. The IAD 34 communicates the abbreviated-dialed call to the IP network 30 for processing by the VoIP server office 70.

The VoIP server office 70 comprises a firewall 120 which interfaces the abbreviated dialing feature server 72 to the IP network 30. The abbreviated dialing feature server 72 facilitates the abbreviated-dialed calls through the IP network 30 to their intended destinations based on its stored number ranges. The VoIP server office 70 also includes a media gateway 122 to enable its VoIP served customers to place calls to the PSTN via an access tandem 124. The media gateway 122 is controlled by a soft switch 126.

Thus, as described above, each of the PBX 10 and the Centrex group 14 is able to use abbreviated dialing to the numbers for which its routing table points to the IAD 32 or 34. The abbreviated-dialed calls are routed over the VoIP provider's IP network 30 to the desired destination. The destination may receive and display the calling party number (CPN) from which the abbreviated-dialed call originates.

It will be apparent to those skilled in the art that the disclosed embodiments may be modified in numerous ways and may assume many embodiments other than the particular forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
a Voice over Internet Protocol (VoIP) feature server that provides an abbreviated dialing feature over a VoIP platform of an Internet Protocol (IP) network to facilitate abbreviated dialing between a Private Branch Exchange (PBX) that serves a first customer location and a Centrex group that serves a second customer location, the Centrex group provided by a central office switch having a customized dialing plan (CDP) trigger to trigger a query to the VoIP feature server when an abbreviated-dialed call originated from the Centrex group is not recognized by the central office switch as an intra-Centrex call, wherein the central office switch includes a Primary Rate Interface (PRI) facility that is part of the Centrex group,
wherein the PBX includes a first routing table that stores a number range of the Centrex group with instructions to route abbreviated-dialed calls to a first Integrated Access Device (IAD), and wherein the first routing table stores a number range of a VoIP customer local area network (LAN) with instructions to route abbreviated- dialed calls to the first IAD wherein the VOIP customer LAN is located at a third customer location, wherein the query from the central office switch is processed at a Service Control Point (SCP) that includes a second routing table, wherein the second routing table of the SCP stores a number range of the VOIP customer LAN with instructions to direct the central office switch to route abbreviated-dialed calls to the PRI facility interfaced to a second IAD, wherein the second IAD is located at the second customer location, and wherein the abbreviated-dialed call is communicated to the IP network by the second IAD interfaced to the PRI facility.

2. The system of claim 1, wherein the PBX is located at the first customer location.

3. The system of claim 2, wherein the second IAD at the second customer location to provides access to the IP network by the Centrex group, the second IAD interfacing to the PRI facility, wherein the first IAD is located at the first customer location to provide access to the IP network by the PBX, and wherein the first IAD interfaces to the PBX via the PRI facility.

4. The system of claim 1, wherein the first IAD is located at the first customer location to provide access to the IP network by the PBX, and wherein the first IAD interfaces to the PBX via the PRI facility.

5. The system of claim 1, wherein the VoIP feature server stores number ranges for the PBX and the Centrex group.

6. The system of claim 1, wherein the abbreviated dialing feature facilitates abbreviated dialing between the first customer location and the VoIP customer LAN at the third customer location, and between the second customer location and the VoIP customer LAN at the third customer location.

7. A system, comprising:
a Voice over Internet Protocol (VoIP) feature server that provides an abbreviated dialing feature over a VoIP platform of an Internet Protocol (IP) network to facilitate abbreviated dialing between a Private Branch Exchange (PBX) that serves a first customer location, a Centrex group that serves a second customer location, and a VoIP customer local area network (LAN) at a third customer location, the VoIP feature server storing number ranges for the PBX, the Centrex group, and the VoIP customer LAN;
wherein the first customer location accesses the IP network via the PBX, wherein the PBX has a first routing table that stores number ranges of the Centrex group and the VoIP customer LAN with instructions to route an abbreviated-dialed call to a first Integrated Access Device (IAD), wherein the Centrex group is provided to the second customer location by first IAD;
a central office switch that includes, a Primary Rate Interface (PRI) facility that is part of the Centrex group, the central office switch having a second routing table which stores a number range used by at least one other customer location that is served by the central office switch with routing instructions to direct the abbreviated-dialed call to the PRI facility, the central office switch having a customized dialing plan (CDP) trigger to trigger a query to the VoIP feature server when the abbreviated-dialed call that originated from the Centrex group is not recognized by the central office switch as an intra-Centrex call;
wherein the second routing table stores a number range of the VoIP customer LAN with instructions to direct the central office switch to route the abbreviated-dialed call to the PRI facility interfaced to a second IAD located at the second customer location, and wherein the query from the central office switch based on a third routing table having number ranges of the PBX and the VoIP customer LAN, the SCP to provide routing instructions to direct the central office switch is processed by a Service Control Point (SCP) to route the abbreviated-dialed call to the PRI facility.

8. A method, comprising:
providing an abbreviated dialing feature over a Voice over Internet Protocol (VoIP) platform of an Internet Protocol (IP) network to facilitate abbreviated dialing between a Private Branch Exchange (PBX) that serves a first customer location and a Centrex Group that serves a second customer location;
storing, in a first routing table at the PBX, a number range of the Centrex group with instructions to route abbreviated-dialed calls to a first Integrated Access Device (IAD) at the first customer location, the first IAD to provide access to the IP network by the PBX;
triggering a query to a service control point (SCP) in response to an abbreviated-dialed call that originated from the Centrex group and is unrecognized by a central office switch as being an intra-Centrex call, wherein the central office switch provides the Centrex group to the second customer location;
providing a routing instruction to direct the central office switch to route the abbreviated-dialed call to a Primary Rate Interface (PRI) facility that is part of the Centrex group in the central office switch, wherein the routing instruction is determined based on a second routine table stored at the SCP and; accessing the IP network via the PBX using the first IAD at the first customer location, the first IAD interfacing to the PBX via the PRI facility; accessing the IP network via the Centrex group using a second IAD that interfaces to a second PRI facility that is part of the Centrex group at the central office switch, wherein the second IAD is located at the second customer location: and storing, in the first routing table of the PBX, a number range of a VOIP customer local area network (LAN) with instructions to route abbreviated-dialed calls to the first IAD, wherein the VOIP customer LAN is located at a third customer location.

9. The method of claim 8, further comprising
providing the second IAD at the second customer location that is interfaced to the PRI facility to communicate the abbreviated-dialed call to the IP network.

10. The method of claim 8, wherein the said triggering is performed by a customized dialing plan (CDP) trigger of the central office switch.

11. The method of claim 8, further comprising storing, in the second routing table, a number range of the VOIP customer local area network (LAN) with instructions to direct the central office switch to route the abbreviated-dialed call to the PRI facility interfaced to the second IAD.

12. The method of claim 8, further comprising storing number ranges for the PBX and the Centrex group at a VoIP feature server.

13. The method of claim 8, wherein the abbreviated dialing feature facilitates abbreviated dialing between the first customer location and a VoIP customer local area network (LAN) at a third customer location, and between the second customer location and the VoIP customer LAN at the third customer location.

* * * * *